Figure 1:
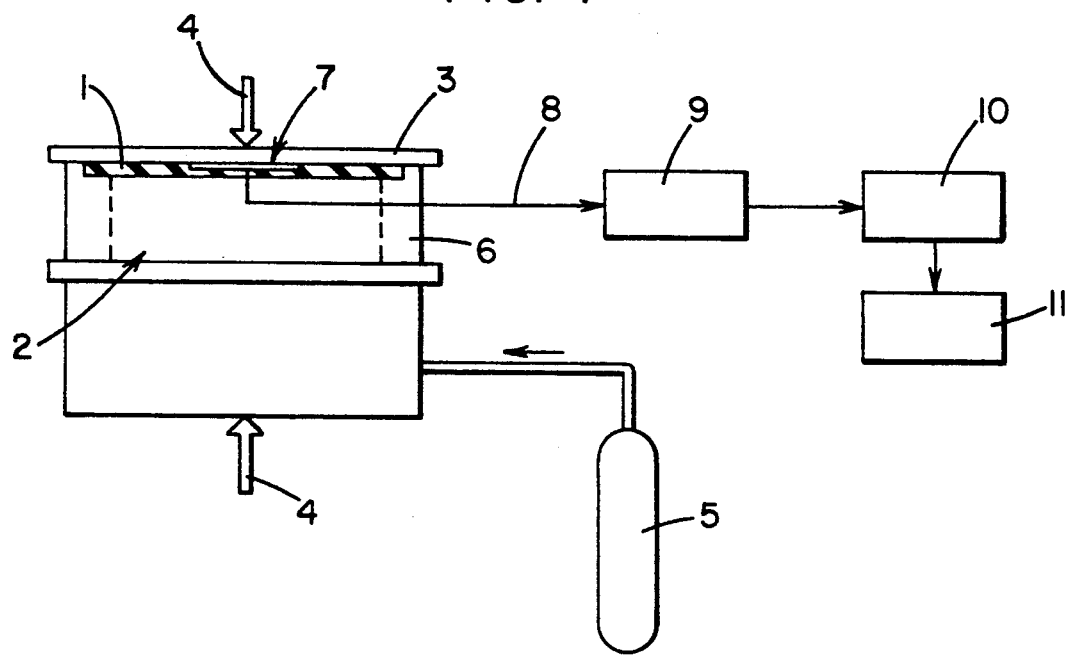

United States Patent [19]

Krishnan et al.

[11] Patent Number: 5,143,967
[45] Date of Patent: Sep. 1, 1992

[54] FREQUENCY SENSITIVE CONDUCTIVE RUBBER COMPOSITION

[75] Inventors: Ram M. Krishnan, Stow; Chia-Li Sun, Hudson, both of Ohio

[73] Assignee: The Goodyear Tire & Rubber Company, Akron, Ohio

[21] Appl. No.: 675,842

[22] Filed: Mar. 27, 1991

[51] Int. Cl.$^5$ .............................. C08K 3/04
[52] U.S. Cl. .................... 524/496; 524/495
[58] Field of Search ................... 524/495, 496

[56] References Cited

U.S. PATENT DOCUMENTS 4,098,968 7/1978 Wortmann et al. ............... 526/1
4,534,889 8/1985 van Konynenburg et al. .... 252/511

*Primary Examiner*—Paul R. Michl
*Assistant Examiner*—Edward Cain
*Attorney, Agent, or Firm*—Henry C. Young

[57] ABSTRACT

A sulfur cured rubber composition composed of selected natural rubber and carbon black for sensing pressure with reference to applied sinusoidal electrical energy.

2 Claims, 5 Drawing Sheets

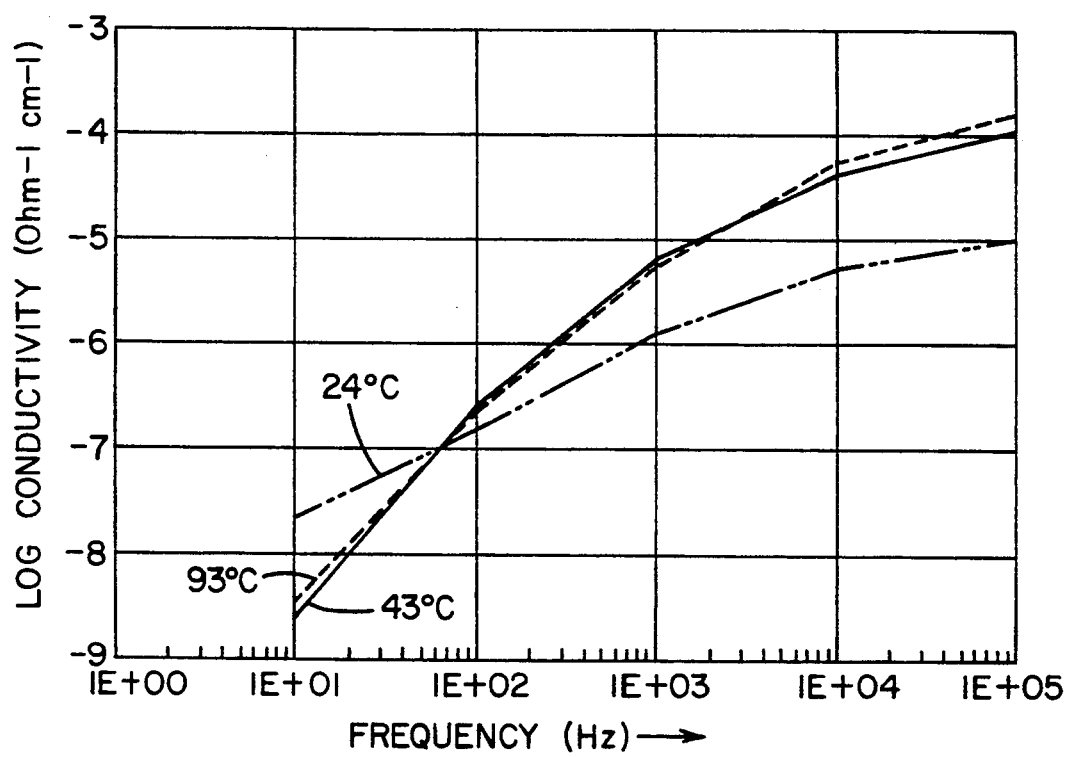

FREQUENCY SENSITIVE CONDUCTIVE RUBBER COMPOSITION

FIELD

This invention relates to a sulfur cured rubber composition containing a dispersion of an electrically conductive carbon black which, on a frequency sensitive basis, exhibits a relatively linear electrical conductivity response to variations of pressure applied to said rubber composition.

BACKGROUND

Rubber compositions are sometimes prepared with dispersions of conductive carbon blacks for various purposes.

For some rubber compositions, carbon blacks are sometimes used which are known as conductive carbon blacks which may be of the heat and/or electrically conductive type. The degree of heat or electrical conductivity of the composition may be dependent somewhat upon the choice and concentration of the carbon black to be dispersed in the rubber.

Pressure sensitive blends of rubber and carbon black have been evaluated (Hassan, et al, 1989 (published 1990), 9(4), 281–94; Appl. Phys. Commun.). There it was found that 40 phr FEF carbon black in a blend of butadiene/acrylonitrile rubber and polychloroprene was optimal. Electrical resistivity of carbon black rubber has been reviewed by T. M. Aminabhavi, et al. - *Rubber Chemistry and Technology*, Volume 63 (July-August, 1990), pages 451–471.

This invention is directed to a rubber containing an electrically conductive carbon black dispersion which exhibits a relatively linear response in conductivity against applied pressures over a suitable range of temperatures which can be suitably sensed by a sensor through application of sinusoidal signal over a wide frequency range.

It is particularly directed to such composition which is frequency sensitive for effectively sensing variations in internal pressure of a pneumatic rubber tire and suitable for use in reporting or transmitting such information to a receiving apparatus.

DISCLOSURE AND PRACTICE OF THE INVENTION

In accordance with this invention, a sulfur cured rubber composition is provided which is comprised of (1) 100 parts by weight natural rubber of grade SMR 5CV or better, and, homogeneously dispersed therein, (2) about 30 to about 45, parts by weight of at least one carbon black having a surface area characterized by an iodine absorption number (ASTM D1510) in a range of about 220 to about 300, preferably about 230 to about 260, a relatively high structure characterized by a dibutylphthalate value (ASTM 2414) in a range of about 150 to about 210 and, preferably about 160 to about 200, a medium particle size of an average in the range of about 20 to about 50, preferably about 25 to about 45, nanometers (nm).

In further accordance with this invention, such rubber composition is considered which is characterized by exhibiting a substantially linear, positively sloped, curve of log conductivity (ohm$^{-1}$cm$^{-1}$) versus pressure applied to said rubber composition for an applied sinusoidal frequency in the range of about 10 Hz to about 500 kHz.

In additional accordance with this invention, such composition is provided which is primarily sensitive to changes in electrical conductivity with minimal influence to external temperature influences.

It is important to appreciate that, for use in sensing pressure variations in rubber products such as, for example, internal air pressure in a pneumatic rubber tire, it is necessary that the variation in conductivity of the rubber composition is substantially linear in response to applied pressure over a suitable range of temperatures, such as from 20° C. to 100° C. and that a plot of the log of the conductivity of the rubber composition versus applied pressure (in a 20–100 psi, or 138–690 kPa, range) presents a substantially linear curve, or line, which exhibits a readily measurable, or detectable, slope.

In order to enable the transmittal of pressure variations, an excitation frequency is transmitted to a transponder, or sensor, attached to or embedded in the rubber composition.

The various pressures are applied to the rubber sample. The resultant change in electrical conductivity of the rubber is sensed by the sensor or transponder attached to or embedded in the rubber via a suitable signal receiver which may be combined with an appropriate analyzer. The analyzer computes the conductivity values.

For a practical application, and for good measurement sensitivities, it is required that a curve determined by a plot of log conductivity of the rubber versus applied pressure be substantially linear to the extent, in a preferable situation, that the curve even approaches or substantially becomes, a straight line. It is required that log of electrical conductivity of the sulfur cured rubber composition versus applied pressure be relatively linear with a positive slope as a result of an externally applied electrical signal of a frequency in a range of about 10 Hz to about 500 kHz.

It is readily understood by those having skill in the rubber compounding art that natural rubber (cis 1,4-polyisoprene rubber) is typically compounded (mixed) with various ingredients to facilitate its cure and to give it suitable physical and aging properties. For example, phenolic and/or amine type antidegradants, zinc oxide, zinc stearate, cure accelerators such as the sulfenamide type, sometimes cure retarder(s) and, of course, sulfur, are typically used.

For the purpose of this invention, a number of rubber compositions were evaluated and it was determined that the best near linear relationship in conductivity over a broad range of conditions was obtained through the use of a high purity natural rubber in combination with the aforesaid carbon black dispersion, and with a carbon black dispersion in the rubber being about 30 to about 45 weight percent based on the rubber itself.

The practice of this invention is further illustrated by reference to the following example which is intended to be representative rather than restrictive of the scope of this invention. Unless otherwise indicated, all parts and percentages are by weight.

EXAMPLE I

Samples of rubber compositions were prepared and sulfur cured at a temperature of about 150° C. to form cured sheets having a thickness of about 0.56 mm.

The rubber samples were comprised of the rubber mixtures shown in the following Table 1.

TABLE 1

| Material | Exp M[5] | Exp W | Exp X | Exp Y | Exp Z |
|---|---|---|---|---|---|
| Natural Rubber | — | 100[1] | 100[2] | 100[3] | 0 |
| EPDM[4] | 100 | 0 | 0 | 0 | 100 |
| Conductive Carbon Black (N-472)[6] | — | 57 | 38 | 76 | 76 |
| Resorcinol Formaldehyde Resin | — | 4 | 0 | 0 | 0 |
| Zinc Oxide | — | 8 | 0 | 0 | 0 |

Conventional amounts of antidegradants, stearic acid and silica were used for Exps. M, X, Y and Z.
[1] RSS2 natural rubber
[2] SMR-5CV natural rubber
[3] SMR-5CV natural rubber
[4] Ethylene/propylene/non-conjugated diene terpolymer rubber
[5] An EPDM rubber composition containing 310 parts SRF-LS carbon black and additional compounding ingredients (not illustrated in Tables 1 and 2)
[6] A carbon black reportedly having an iodine number of about 254, a dibutylphthalate value of about 178 and a particle size of about 30 nm obtained from The Cabot Corporation

TABLE 2

| Cure Package | Exp M | Exp W | Exp X | Exp Y | Exp Z |
|---|---|---|---|---|---|
| Zinc Oxide | — | 0 | 10 | 10 | 10 |
| Cure Retarder[1] | — | 0.2 | 0 | 0 | 0 |
| Sulfur | — | 5 | 3 | 3 | 3 |

Conventional amounts of antioxidant and accelerator of the sulfenamide type were used for Exp. M, X, Y and Z.
[1] Thiophthalamide type.

The cured samples were tested for electrical conductivity at prescribed temperatures over a designated frequency range and for a variation of pressures supplied to the cured rubber samples.

The ingredients of Table 1 were first mixed together (non-productive stage of mixing) and, then, the ingredients of Table 2 were mixed therewith (productive stage of mixing).

Reference to FIG. 1 of the drawings may be made to more fully understand the conductivity measurements made on the individual cured rubber composition stocks.

Each rubber stock (Test Sample) 1 was placed inside a bladder mold 2. The inside mold cavity was about 7.6 cm × 2.5 cm. The test sample surface had been cleaned by wiping with a solvent, such as acetone or toluene, to help effect a good contact with sensor 7.

The mold 2 was covered with a top plate 3 and the assembly placed in a platen press 4 which is heated to various temperatures (20° C.–100° C). The pressure on the sample is varied by varying nitrogen pressure applied from a nitrogen cylinder 5 to the bladder 6 (20 to 120 psi) which, in turn, presses against the test sample 1.

A sensor 7, was placed against the test sample 1 surface and was, thus, between the test sample 1 and top plate 3.

Figure 2:
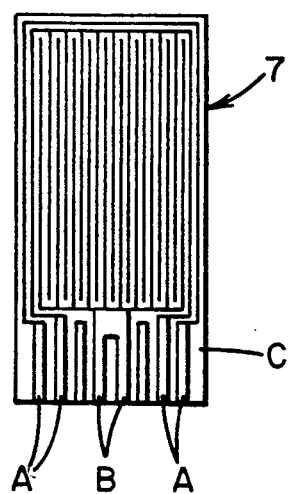

The sensor 7 is depicted by FIG. 2 with thin, flat electrodes A and B adhered to a thin plastic film C. The side of the sensor 7 with the said electrodes is placed against the cleaned surface of sample 1. The integrated digitized electrical (IDEX) sensor had an A/D ratio of 80 (Area of the electrode/distance between electrodes).

The sensor 7 was electrically connected through a mid conductivity plug interface 8, which was a multiple electrical conductor cable with connecting plug(s), to a dielectric analyzer 9. The dielectric analyzer 9 was equipped with an alternating current (AC) capacitance bridge in conjunction with a pair of comb electrodes. The dielectric analyzer had a capability of generating a digitally synthesized sinusoidal excitation with a frequency range of 0.001 Hz (Hertz) to 100,000 Hz (100 kHz), and was accurately controlled by a crystal oscillator. The analyzer 9 sampled the response from a test sample 1, 3600 times over a number of cycles, stored the data and performed a correlation with the excitation waveform to obtain the gain, (magnitude), and phase of the response.

The experiments were run automatically by the Analyzer 9 with sequential measurements taken at the frequencies selected.

The storage of the data permitted later processing and analysis by a computer 10 with an eventual output to a printer 11.

The Analyzer 9, determined the permitivity E', or dielectric constant, and the loss factor E'' as a result of sending the gain, phase and frequency. The gain was represented as 20 [log(magnitude)] in decibel (db) units. The following formulas were used, primarily by the Analyzer:

$$E' = A * Sin (P)/((2 * PI * F * Eo * (A/D))$$

$$E'' = A * Cos (P)/((2 * PI * F * Eo * (A/D))$$

where
- A = Admittance returned from the microdielectrometer in (1/ohms)
- P = Phase returned from the microdielectrometer in (degrees)
- Eo = Permitivity of free space as (8.85+EXP (−14) Farads/cm)
- F = Frequency at which measurement was performed in cycles/second
- A/D = Equivalent ratio for sensor being used, in cm.
- PI = 3.14159.

The conductivity is calculated from the loss factor E'' value.

Conductivity = E'' * Eo * 2 * PI * F where the conductivity measured was surface conductivity.

The Log (Conductivity) for the test results from the samples was plotted against various pressures at various applied frequencies.

The generation and sending of the signal to the sensor; the sensing of the response, conversion of the response to meaningful information and the calculations of E', E'' and conductivity were accomplished automatically by the Analyzer. The user selects the frequency and inputs the sample temperature, pressure and the A/D ratio. A value of 80 was used for the A/D for the sensor.

The Analyzer system used The Eumetric ® System III obtained from Micromet Instruments, Inc., Cambridge, Mass. 02139, USA. The sensor used was identified IDEX from the same company.

Figure 6:
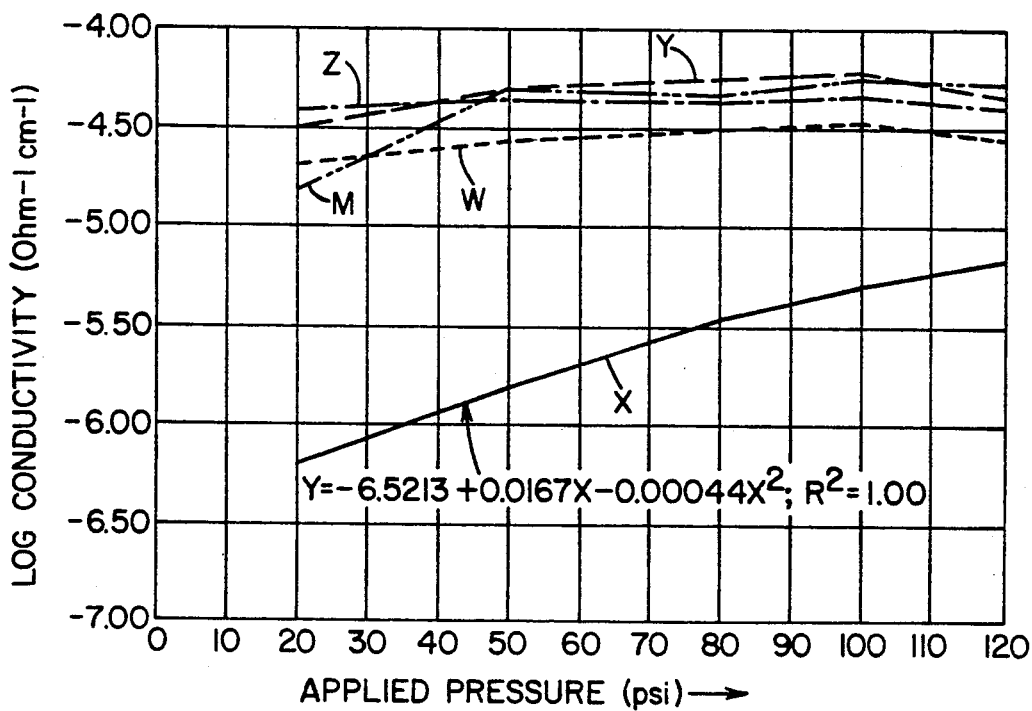
Figure 7:
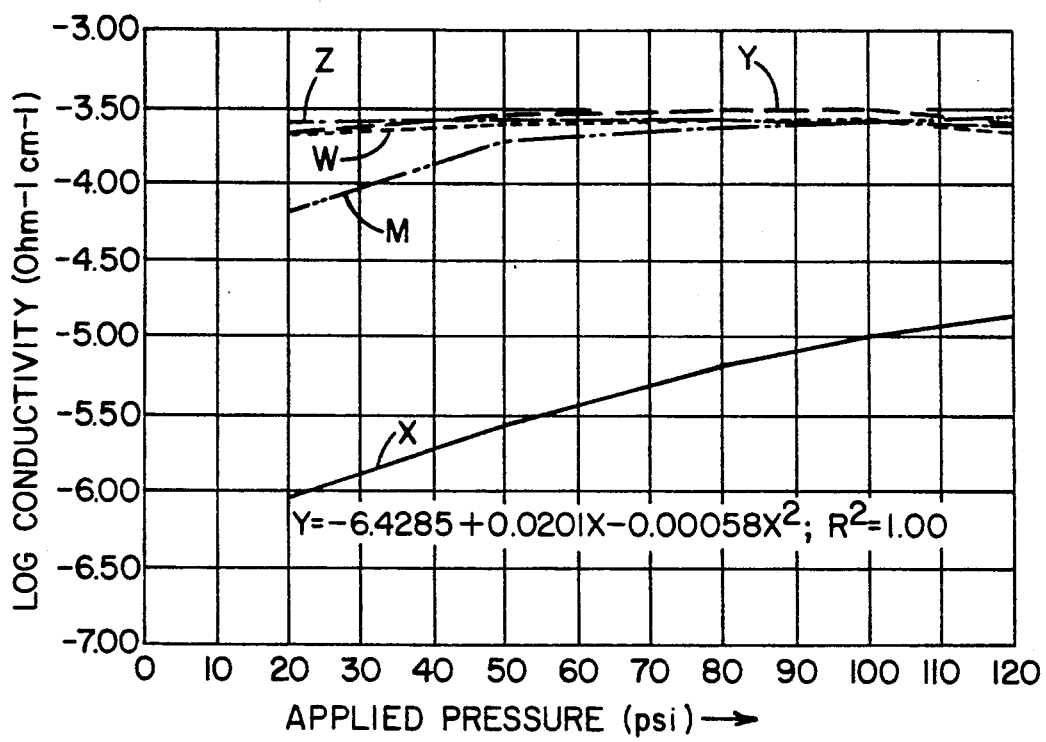
Figure 8:
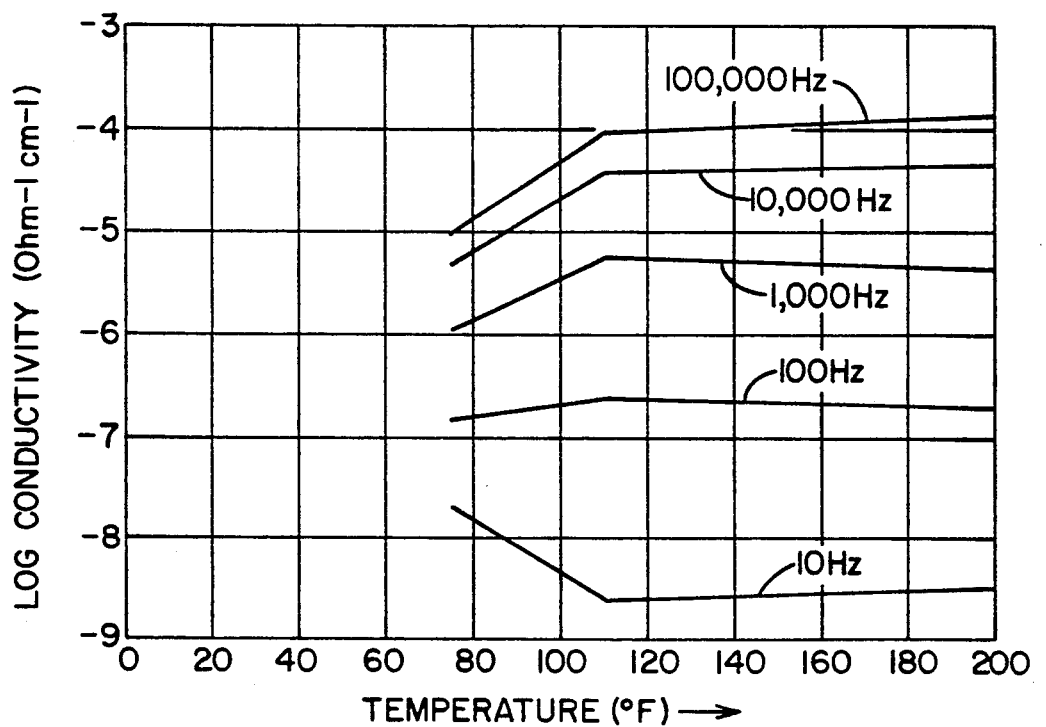

Reference to the Drawings and particularly to FIGS. 3–7 shows such graphs of applied pressures at different frequencies for each graph and FIGS. 8–9 are graphs showing the effect of various temperatures.

The information for the graphs are shown in the following Tables.

TABLE 3

Figure 3:
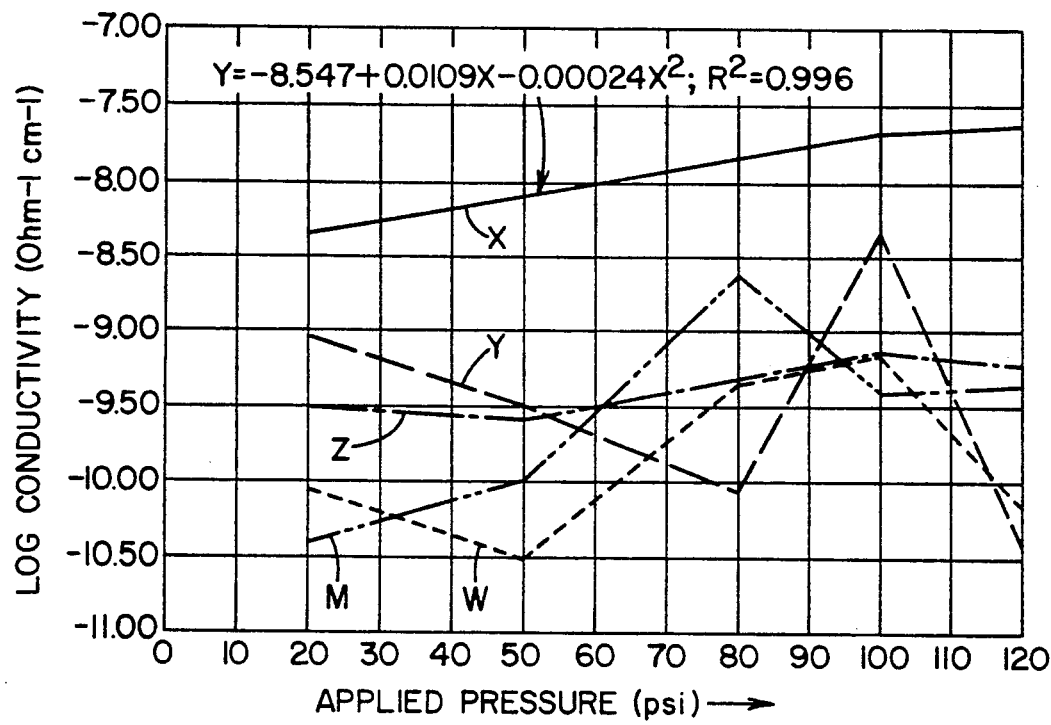

Log Conductivity (ohm −1/cm −1)
(23° C., 10 Hz) (See FIG. 3)

| Applied Pressure (psi) | Exp M | Exp W | Exp X | Exp Y | Exp Z |
|---|---|---|---|---|---|
| 20 | −10.41 | −10.06 | −8.33 | −9.04 | −9.50 |
| 50 | −9.99 | −10.52 | −8.08 | −9.50 | −9.58 |
| 80 | −8.61 | −9.35 | −7.83 | −10.06 | −9.32 |
| 100 | −9.40 | −9.15 | −7.67 | −8.33 | −9.14 |
| 120 | −9.35 | −10.18 | −7.60 | −10.41 | −9.21 |

TABLE 4

Figure 4:
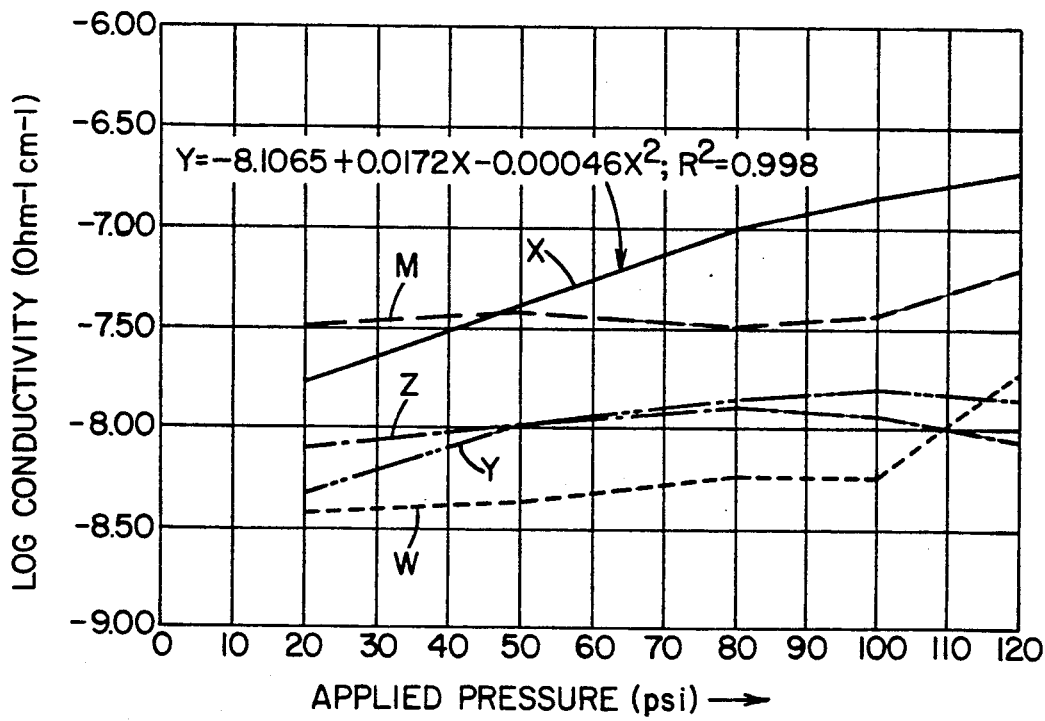

Log Conductivity (ohm −1/cm −1)
(23° C., 100 Hz) (See FIG. 4)

| Applied Pressure (psi) | Exp M | Exp W | Exp X | Exp Y | Exp Z |
|---|---|---|---|---|---|
| 20 | −8.33 | −8.43 | −7.77 | −7.49 | −8.10 |
| 50 | −8.00 | −8.37 | −7.39 | −7.42 | −7.99 |
| 80 | −7.86 | −8.24 | −7.00 | −7.48 | −7.89 |
| 100 | −7.80 | −8.24 | −6.84 | −7.42 | −7.93 |
| 120 | −7.84 | −7.70 | −6.71 | −7.18 | −8.05 |

TABLE 5

Figure 5:
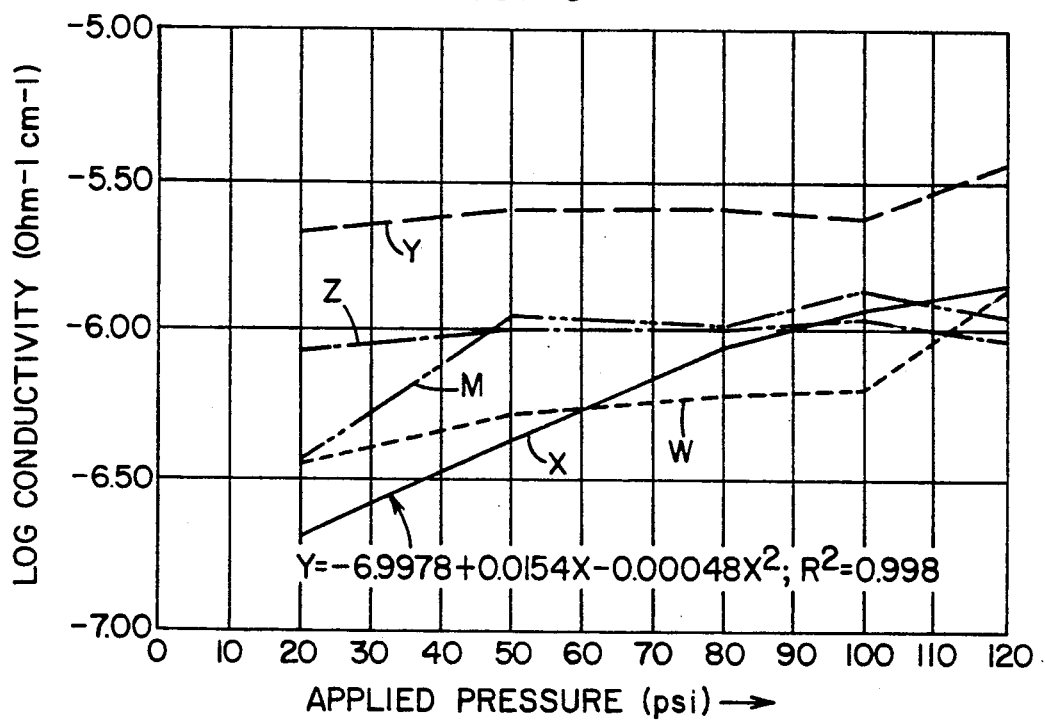

Log Conductivity (ohm −1/cm −1)
(23° C., 1000 Hz) (See FIG. 5)

| Applied Pressure (psi) | Exp M | Exp W | Exp X | Exp Y | Exp Z |
|---|---|---|---|---|---|
| 20 | −6.44 | −6.45 | −6.70 | −5.67 | −6.07 |
| 50 | −5.95 | −6.28 | −6.37 | −5.59 | −6.00 |
| 80 | −5.98 | −6.21 | −6.05 | −5.58 | −6.00 |
| 100 | −5.86 | −6.19 | −5.93 | −5.61 | −5.96 |
| 120 | −5.94 | −5.86 | −5.84 | −5.44 | −6.02 |

TABLE 6

Log Conductivity (ohm −1/cm −1)
(23° C., 10,000 Hz) (See FIG. 6)

| Applied Pressure (psi) | Exp M | Exp W | Exp X | Exp Y | Exp Z |
|---|---|---|---|---|---|
| 20 | −4.82 | −4.69 | −6.20 | −4.50 | −4.41 |
| 50 | −4.30 | −4.56 | −5.81 | −4.31 | −4.36 |
| 80 | −4.32 | −4.50 | −5.46 | −4.24 | −4.35 |
| 100 | −4.24 | −4.47 | −5.29 | −4.21 | −4.33 |
| 120 | −4.27 | −4.52 | −5.16 | −4.32 | −4.38 |

TABLE 7

Log Conductivity (ohm −1/cm −1)
(23° C., 100,000 Hz) (See FIG. 7)

| Applied Pressure (psi) | Exp M | Exp W | Exp X | Exp Y | Exp Z |
|---|---|---|---|---|---|
| 20 | −4.18 | −3.67 | −6.05 | −3.67 | −3.60 |
| 50 | −3.71 | −3.60 | −5.57 | −3.54 | −3.58 |
| 80 | −3.62 | −3.58 | −5.19 | −3.50 | −3.58 |
| 100 | −3.57 | −3.56 | −5.00 | −3.49 | −3.57 |
| 120 | −3.55 | −3.63 | −4.85 | −3.57 | −3.58 |

Inspection of FIG. 3 readily shows that the curve for Exp. X is substantially linear for the 23° C. (room temperature) test with 10 Hz excitation over the indicated pressure range. In contrast to the curves for Exps. M, W, Y and Z, the Exp. X curve demonstrates a significant positive slope which is necessary for a more detectable pressure differential gradient.

Inspection of FIG. 4 (100 Hz excitation) demonstrates similar results as FIG. 3.

Inspection of FIG. 5 (1000 Hz excitation) demonstrates similar results as FIG. 3 with the positive linear slope of the curve for Exp. X being somewhat more dramatic.

Inspection of FIG. 6 (10,000 Hz excitation) demonstrates results similar to FIG. 5. While the curves for Exps. M, W, Y and Z are becoming substantially linear, their slope is near zero (flat).

Inspection of FIG. 7 (100,000 Hz excitation) demonstrates results similar to FIG. 6.

It is apparent from FIGS. 3–7 that Exp. X rubber composition is clearly differentiated from Exps. M, W, Y and Z in presenting, at 23° C., a desirable curve for detecting a pressure gradient over a wide frequency excitation range.

It is considered that Exp. X would demonstrate a similar characteristic curve with a positive slope at least to a 500 kHz excitation frequency.

Consequently, the response of rubber composition Exp. X was evaluated at 100 psi pressure over a wider temperature range by excitation over a wide frequency range as shown in the following Table 8 and depicted in FIG. 8.

TABLE 8

| Temp (°F.) | 10 Hz | 100 Hz | 1000 Hz | 10 kHz | 100 kHz |
|---|---|---|---|---|---|
| 75 | −7.67 | −6.84 | −5.93 | −5.29 | −5.00 |
| 110 | −8.61 | −6.62 | −5.23 | −4.38 | −3.99 |
| 200 | −8.49 | −6.69 | −5.29 | −4.29 | −3.81 |

FIG. 8 demonstrates that the response (log conductivity) to the Exp. X composition over temperatures ranging from 75° F. (24° C.) to 200° F. (93° C.) and over a wide range of excitation frequencies increase as the excitation frequency increases. At the medium to higher temperature ranges, the response tends to be relatively flat and not highly sensitive to temperature.

Table 9 represents data for testing Exp. X composition at 100 psi (600 kPa) pressure at various frequencies over a temperature range and depicted in FIG. 9 as a plot of log conductivity against log of the frequency. The frequency is presented in a log scale. For example, 1E+02 translates to 100 Hz.

TABLE 9

| Freq (Hz) | 75° F. | 110° F. | 200° F. |
|---|---|---|---|
| 10 | −7.67 | −8.61 | −8.49 |
| 100 | −6.84 | −6.62 | −6.69 |
| 1,000 | −5.93 | −5.23 | −5.29 |
| 10,000 | −5.29 | −4.38 | −4.29 |
| 100,000 | −5.00 | −3.99 | −3.81 |

FIG. 9 demonstrates that at all frequencies for the temperatures of 110° F. (43° C.) and 200° F. (93° C.) only a little change in conductivity is indicated. In addition, at a specific 100 Hz frequency, little or no conductivity change occurs with variations in temperatures ranging from 75° F. (24° C.) to 200° F. (93° C.). Thus, for Exp. X composition, there is demonstrated little influence attributed to temperature change. This is important in that the measurement of conductivity is attributed to changes in pressure with minimal interference from external factors such as temperature. Thus, FIG. 8 and 9 both demonstrate the importance of this concept. Thus, a temperature compensating means is not normally considered necessary.

In the description of this invention, the grade of the purity of the natural rubber was observed to be important. A grade of SMR 5CV or better is considered to be acceptable. Reference may be made to *The Vanderbilt Rubber Handbook* (1978), page 32.

Thus, it is considered that the rubber composition of this invention is suitable for use in sensing tire pressure or pressure differentials, particularly when positioned in or about the tire innerliner or similar location, particularly where the tire may experience a wide range of temperatures.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur cured rubber composition characterized by exhibiting a substantially linear, positively sloped, curve of log conductivity (ohm$^{-1}$cm$^{-1}$) versus applied pressure to the said rubber composition for an applied sinusoidal electrical energy having a frequency in the range of about 10 Hz to about 500 kHz; wherein said rubber composition is comprised of (1) 100 parts by weight natural rubber of grade SMR 5CV purity or better, and, homogeneously dispersed therein, (2) about 30 to about 45 parts by weight of at least one carbon black having a surface area characterized by an iodine absorption number in a range of about 220 to about 300 a relatively high structure characterized by a dibutylphathalate value in a range of about 150 to about 210 and a particle size of an average in the range of about 20 to about 50 nanometers.

2. The sulfur cured rubber composition of claim 1 which is primary sensitive to changes in such electrical conductivity with minimal influence to external temperature variations.

* * * * *